April 27, 1926.
C. L. JOHNSON
TRANSMISSION LOCK
1,582,822
Filed Jan. 25, 1924 2 Sheets-Sheet 2
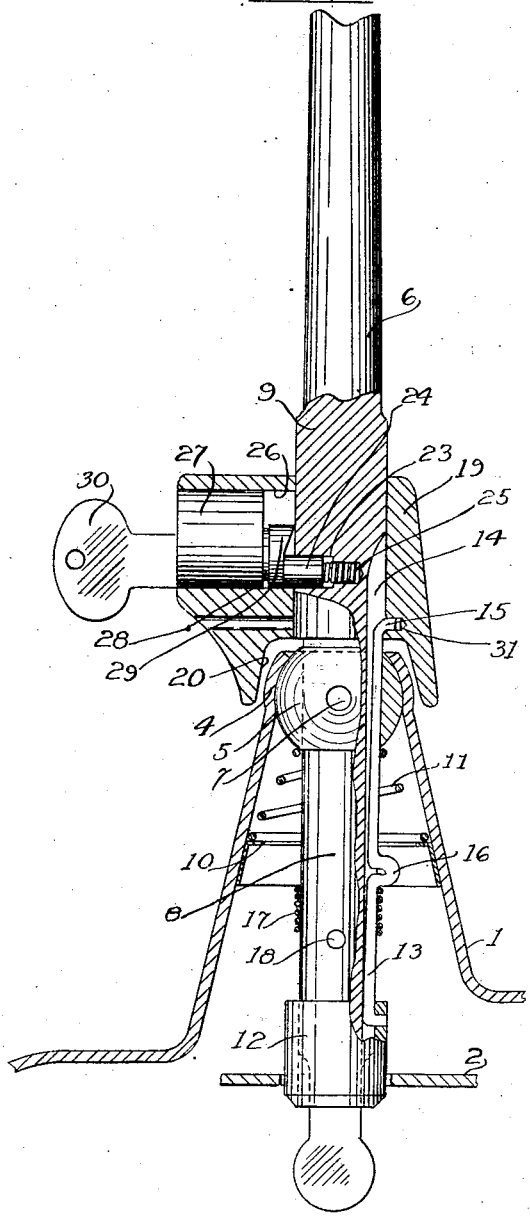
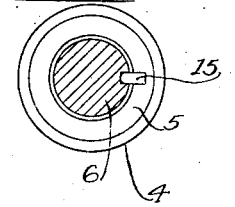
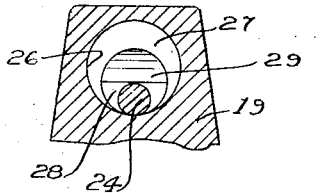
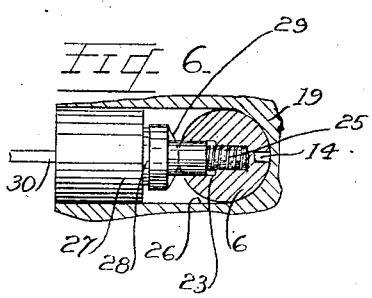
Inventor
Colvin L. Johnson
by
Attys Patented Apr. 27, 1926.

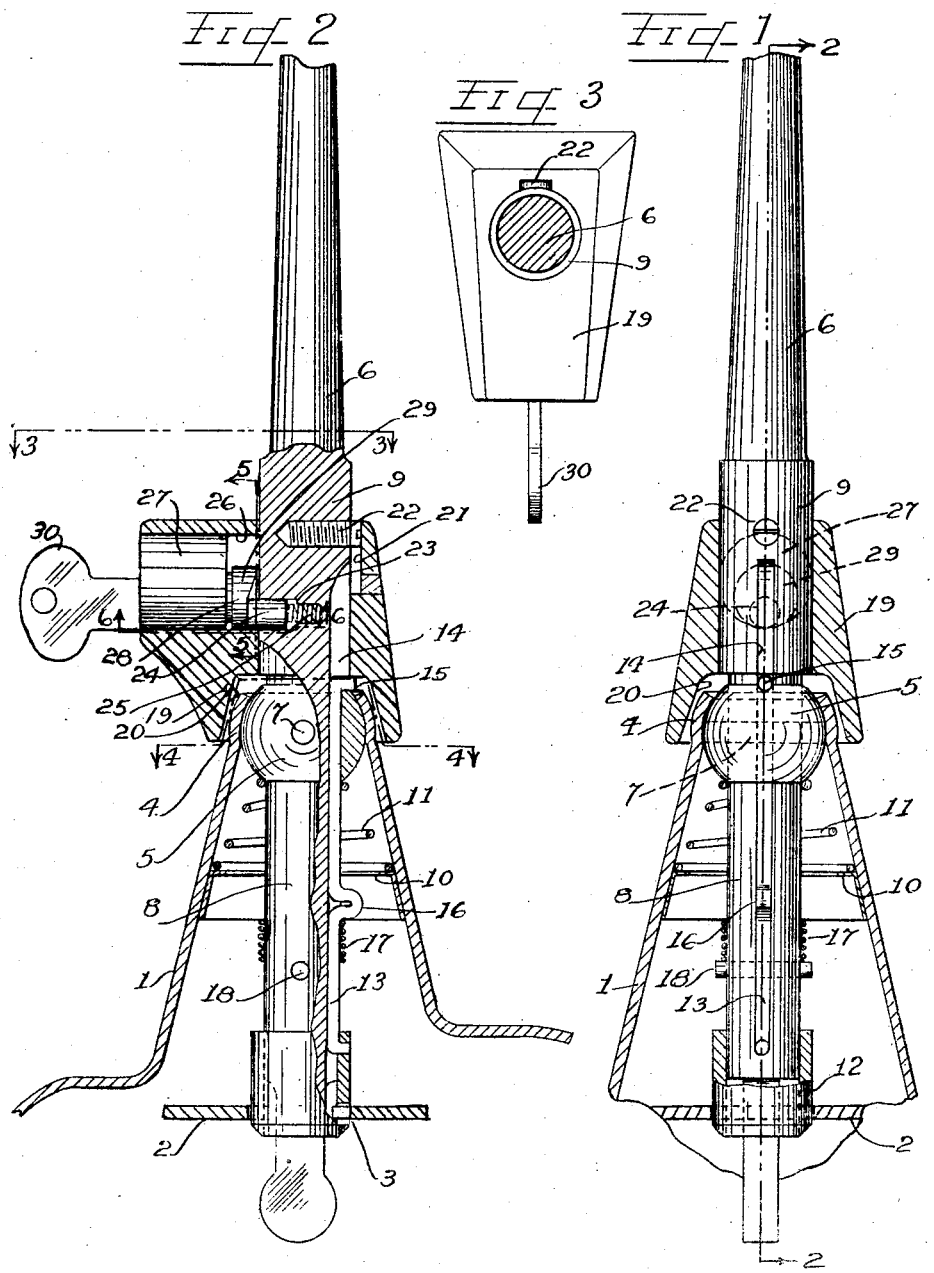

1,582,822

UNITED STATES PATENT OFFICE.

COLVIN L. JOHNSON, OF ST. LOUIS, MISSOURI, ASSIGNOR TO JOHNSON AUTOMOBILE LOCK COMPANY, A CORPORATION OF ILLINOIS.

TRANSMISSION LOCK.

Application filed January 25, 1924. Serial No. 688,360.

*To all whom it may concern:*

Be it known that I, COLVIN L. JOHNSON, a citizen of the United States, and a resident of the city of St. Louis, in the State of Missouri, have invented certain new and useful Improvements in a Transmission Lock; and I hereby declare that the following is a full, clear, and exact description of the same, reference being had to the accompanying drawings, and to the numerals of reference marked thereon, which form a part of this specification.

This invention relates to an improved type of a transmission lock associated with a gear shift lever having a shiftable housing thereon carrying a key operated pin lock and adapted to be manually pushed on the gear shift lever into a locked position to move a spring controlled locking collar on the lower end of the gear shift lever into a locking position in a recessed stationary plate to hold the gear shift lever locked against movement in a neutral position.

It is an object of this invention to provide a gear shift lever with a locking member adapted to be moved into locking position by means of a protecting housing which is adapted to be automatically locked in its lowermost position by a spring pressed bolt and is further adapted to be released by means of a key to permit a compressed control spring on the gear shift lever below the pivot point thereof to act automatically to simultaneously return the protecting housing and the locking member back into raised normal unlocked position to permit operation of the gear shift lever.

It is also an object of the invention to provide a gear shift lever with a protecting housing adapted to be supported on a slidable rod having a locking member thereon and furthermore being formed with an offset to seat on a spring mounted on the gear shift lever below the ball member thereof.

It is an important object of this invention to provide a gear shift lever lock of simplified and improved construction and having a spring supported locking member mounted on the lower end of a spring supported gear shift lever, said locking member adapted to be actuated by the movement of a protecting housing slidable on the gear shift lever.

Other and further important objects of this invention will be apparent from the disclosures in the specification and accompanying drawings.

The invention (in a preferred form) is illustrated in the drawings and hereinafter more fully described.

On the drawings:

Figure 1 is a fragmentary longitudinal sectional view of a gear shift lever and a locking mechanism therefore embodying the principles of this invention with parts in elevation.

Figure 2 is a sectional view taken on line 2—2 of Figure 1 showing parts in elevation.

Figure 3 is a transverse section taken on line 3—3 of Figure 2.

Figure 4 is a transverse section taken on line 4—4 of Figure 2.

Figure 5 is a fragmentary detail section taken on line 5—5 of Figure 2.

Figure 6 is a detail section on line 6—6 of Figure 2 showing parts in elevation.

Figure 7 is a fragmentary longitudinal sectional view of a modified form of a gear shift lever and a locking mechanism therefore.

As shown on the drawings:

The reference numeral 1 indicates an upright fulcrum housing or gear shift lever supporting pedestal mounted or formed on the cover plate of a vehicle gear shift casing (not shown). Mounted within the gear shift casing below the conical pedestal 1 is a plate 2 having a guide slot or opening 3 therein. The upper portion of the pedestal 1 is provided with a rounded recess or socket 4 for receiving, from below, the pivot ball 5 of a gear shift lever 6. The pivot ball 5 is in the form of a sleeve and is rigidly secured by means of a rivet or pin 7 upon the tail piece 8 of the gear shift lever 6 below an enlarged cylindrical body portion 9. Secured to the inner walls of the pedestal 1 is a flanged ring 10 upon which the lower coil of a conical coiled spring 11 seats. The upper coil of the spring 11 presses against the pivot ball 5 and resiliently supports the gear shift lever in position with the pivot ball seated in the socket 4.

Slidably engaged on the gear shift level tail piece 8 is a locking block or collar 12. Attached to the locking block 12 is the lower end of a heavy wire or rod 13 which is disposed to slide within a longitudinal groove or recess 14 extending from the tail piece 8 upwardly into the lower portion of the body portion 9 (Figure 2). The upper end of the rod 13 is bent over to form a lug or finger 15 which projects outwardly over the upper end of the pivot ball 5. The rod 13, intermediate its ends, is bent to form an outwardly projecting loop or projection 16 against which a coiled spring 17 engages to hold the rod 13 and the locking block 12 in elevated release position. The spring 17 is coiled around the tail piece 8 below the ring seat 10 and has its lower end engaged on a pin 18 which projects through the tail piece 8.

Shiftable upon the lever body portion 9 is a steel casing 19 the lower end of which is provided with a recess 20 adapted to receive the socket 4 when the casing 19 is lowered. The casing 19 is provided with a slot 21 into which the outer end of a screw stud 22 projects to act as a stop to limit the upward movement of the casing 19. The screw stud is threaded into a threaded radial opening provided in the lever body portion 9 (Figure 2).

The body portion 9 of the gear shift lever is also provided with a recess 23 in which a latch pin or bolt 24 is slidably engaged. A coiled spring 25 in the recess 23 acts to hold the latch bolt projected. The casing 19 is provided with an opening 26 into which the latch bolt 24 is adapted to be projected to hold the casing 19 and the locking block 12 locked in their lowered locking positions. Mounted in the housing recess 26 is a pin lock 27 having a barrel 28 to which a cam 29 is secured. The cam 29 is positioned to be contacted by the latch bolt 24. A key 30 is provided for the pin lock 27 to permit rotation of the cam 29 and retraction of the latch bolt 24.

The modified form of the gear shift lever locking mechanism illustrated in Figure 7 is substantially the same as that illustrated in Figure 2 with the exception that the finger 15 formed on the upper end of the shiftable rod 13 seats in a recess 31 in the casing 19.

The operation is as follows:

By inserting the key 30 into the pin lock 27 the cam 29 may be rotated to cause the latch bolt 24 to be retracted into the recess 23 against the action of the spring 25. With the latch bolt retracted the control spring 17 acts automatically to slide the connecting rod 13 upwardly thereby simultaneously raising the casing 19 and retracting the locking block 12 from its locking engagement with the plate 2. The upward movement of the casing 19 is limited by the stud 22 and the length of the slot 21.

With the parts in unlocked positions as described, the gear shift lever 6 may be operated to shift the gears by means of the lower end of the lever tail piece 8.

To lock the gear shift lever against operation it is only necessary to first move the same into neutral position and then manually push casing 19 downwardly into the position illustrated in Figure 2 against the action of the spring 17. Downward movement of the casing 19 causes the rod 13 to slide downwardly to push the locking block 12 into locking engagement with the plate 2.

As the casing is moved downwardly the latch bolt 24 is brought into register with the casing recess 26 and the spring 25 acts to push the latch bolt outwardly into the recess 26 against the cam 29. The casing 19 is thus locked in its lowered position and protects the upper end of the pedestal preventing access to the lever locking parts.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a pivoted gear shift lever, of a casing, a lever locking means slidably engaged on said lever, a member connecting said casing with said locking means, a projection formed on said connecting member intermediate the ends thereof, and a spring supported on said lever below the pivot point thereof and engaging said projection resiliently to support said casing and locking means.

2. The combination with a pivoted gear shift lever, of a casing, a lever locking means slidably engaged on said lever, a rod disposed in a longitudinal recess in said lever and connecting said casing with said locking means, a projection formed on said rod intermediate the ends thereof, and a spring supported on said lever below the pivot point thereof and engaging said projection resiliently to support said casing and locking means.

In testimony whereof I have hereunto subscribed my name.

COLVIN L. JOHNSON.